April 10, 1945.  C. B. LINN  2,373,580
ALKYLATION OF AROMATIC HYDROCARBONS
Filed June 28, 1940
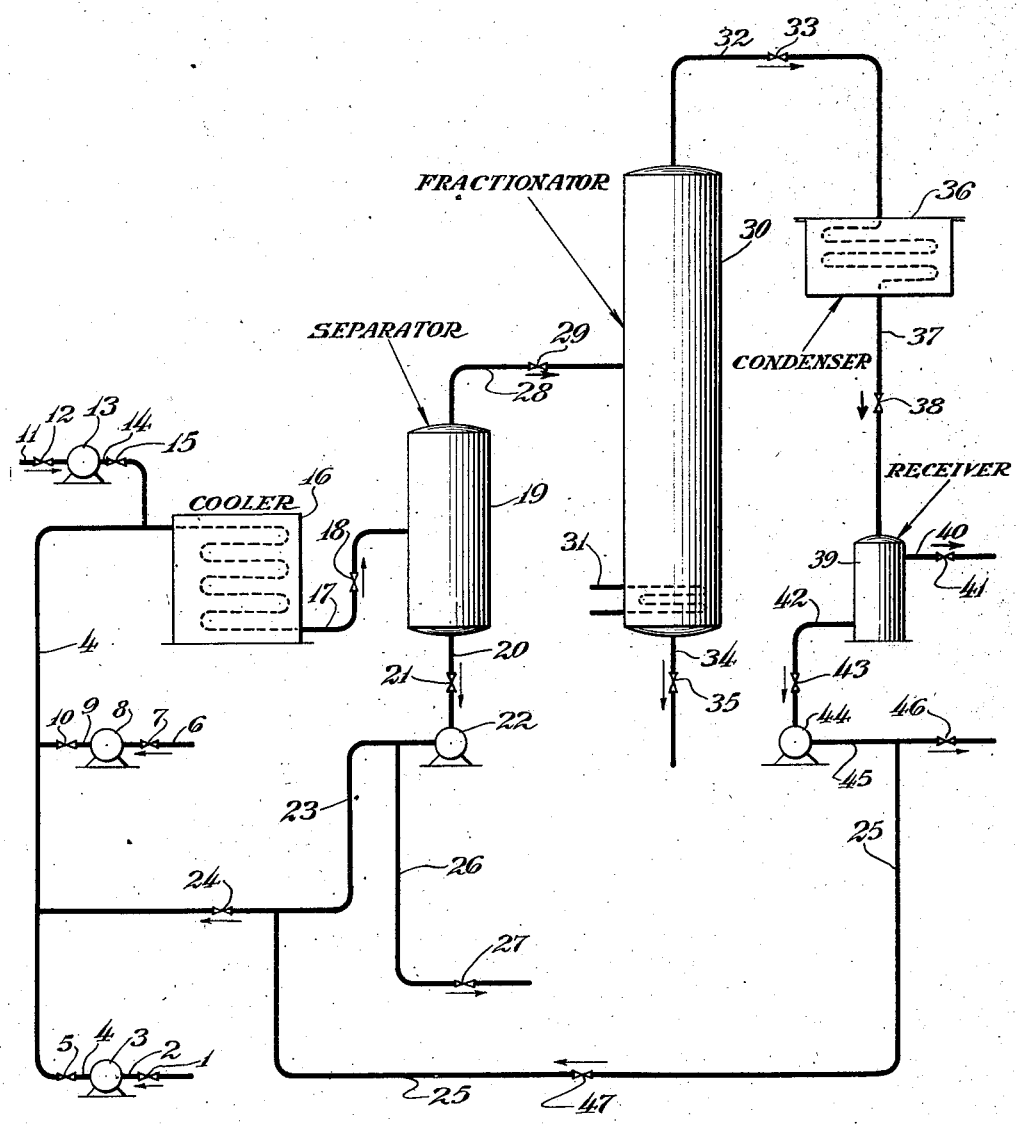
INVENTOR.
Carl B. Linn
BY Lee J. Gary
Attorney.

Patented Apr. 10, 1945

2,373,580

UNITED STATES PATENT OFFICE 2,373,580

ALKYLATION OF AROMATIC HYDROCARBONS

Carl B. Linn, Chicago, Ill., assignor to Universal Oil Products Company, Chicago, Ill., a corporation of Delaware Application June 28, 1940, Serial No. 342,974

7 Claims. (Cl. 260—671)

This invention is concerned with the interaction of aromatic hydrocarbons with alkyl fluorides in the presence of a catalyst. It is more specifically concerned with a simple and easily regulated process involving the use of a liquid catalyst which is altered only slightly in the course of the reaction but which catalyzes the desired reactions with a maximum of efficiency.

Processes for the formation of more highly alkylated aromatic hydrocarbons from less highly alkylated aromatic hydrocarbons are of importance not only from the standpoint of producing high antiknock motor fuel fractions but for preparing alkylated aromatic hydrocarbons useful as intermediates in the production of synthetic organic chemicals.

In one specific embodiment the present invention comprises a process for alkylating aromatic hydrocarbons by alkyl fluorides in the presence of hydrogen fluoride to form alkylated aromatic hydrocarbons.

According to the present invention aromatic hydrocarbons, including benzene and its homologs, may be alkylated though obviously under somewhat modified conditions of operation when alkylating aromatic hydrocarbons of different activities and particularly when alkylating polycyclic aromatic hydrocarbons. The alkyl fluoride utilized may be either normally gaseous or normally liquid such as ethyl fluoride and its higher boiling homologs.

Alkyl fluorides used as alkylating agents in the process of this invention may be formed by the addition of hydrogen fluoride to mono-olefinic hydrocarbons at a temperature within the approximate range of —60 to +100° C. and more preferably at a temperature of the order of —30 to 0° C. and under a pressure sufficient to maintain in liquid phase a substantial proportion of the reaction mixture. At the higher temperatures polymerization tends to occur which interferes with the direct conversion of the original olefin into alkyl fluorides. Such a formation of alkyl fluorides may be brought about by the use of substantially anhydrous hydrogen fluoride or by employing a portion of the hydrogen fluoride obtained as a by-product of the present aromatic hydrocarbon alkylating process.

Substantially anhydrous hydrogen fluoride utilizable as catalyst in the process of this invention is a liquid boiling at about 20° C. and accordingly it can be used as liquid in apparatus which is cooled to maintain temperatures below this point or it can be used at higher temperatures which are below the critical temperature if sufficient pressure is maintained upon the apparatus. By maintaining an excess of an aromatic hydrocarbon at all times and generally up to approximately 20 times the molecular proportion of alkyl fluoride present, formation of olefin polymers is avoided with the result that there is a relatively high conversion of aromatic hydrocarbons and alkyl fluorides into alkylated aromatic hydrocarbons. Also hydrogen fluoride formed from alkyl fluorides during the alkylation reaction may subsequently be employed as alkylating catalyst or it may be utilized in the production of a further quantity of alkyl fluoride to be returned to the process.

In operating the present process a preferred procedure is to agitate a mixture of an aromatic hydrocarbon and liquid hydrogen fluoride and gradually introduce thereto a mixture of an alkyl fluoride and an aromatic hydrocarbon suitably below the surface of the hydrogen fluoride-aromatic hydrocarbon mixture. In the batch operation of this process, the agitation may be stopped and the upper hydrocarbon layer removed and fractionated to recover unchanged aromatics and the desired alkylated products. Obviously the process may be made continuous by providing a mixing zone, as a reactor containing baffles and/or orifices, in which sufficient time may be given for the completion of the desired alkylation reactions followed by a settling zone from which a hydrocarbon layer may be withdrawn and fractionated to recover desired alkylated hydrocarbons and unconverted aromatics for recycling, while the lower layer of hydrogen fluoride may be pumped back to the alkylating step for further reaction.

The aforementioned reaction of an aromatic hydrocarbon with an alkyl fluoride may be carried out at a temperature in the approximate range of —10 to +75° C. but preferably at a temperature of approximately 20° C. Pressure applied to the reaction mixture should preferably be sufficient to compensate for the vapor pressure of the reactants. Thus reaction may be attained to advantage by subjecting a mixture of aromatic hydrocarbon, alkyl fluoride, and hydrogen fluoride to contact in the liquid phase.

For the purpose of illustrating one type of apparatus in which the process may be conducted, the attached drawing shows diagrammatically in general side elevation and by the use of conventional figures an arrangement of interconnected units suitable for continuous operations. It is understood that minor features of apparatus construction may be modified without departing essentially from the generally broad scope of the invention.

Referring to the drawing an aromatic hydrocarbon fraction may be introduced through line 1 containing valve 2 to pump 3 which discharges through line 4 containing valve 5 while hydrogen fluoride is introduced to line 4 by way of line 6 containing valve 7 and pump 8 which discharges through line 9 and valve 10. The mixture of aromatic hydrocarbon and hydrogen fluoride being conducted through line 4 is therein commingled with a regulated and continuous stream of an alkyl fluoride or of an alkyl fluoride-aromatic hydrocarbon mixture introduced through line 11 and valve 12 to pump 13 which discharges through line 14 and valve 15, to line 4, already mentioned, from which the commingled mixture passes through cooler 16 of any suitable construction and capacity for maintaining the temperature of reaction below any desired level while simultaneously permitting sufficient time of contact for completion of the desired reactions. From cooler 16 the reaction products follow line 17 containing valve 18 to separator 19 in which is effected a separation of hydrogen fluoride and hydrocarbons. The hydrogen fluoride layer is withdrawn from separator 19 through line 20 containing valve 21 to pump 22 which discharges through line 23 and valve 24 into line 4 so that the hydrogen fluoride catalyst may be recycled. If desired, a portion of the hydrogen fluoride being discharged by pump 22 through line 23 may be conducted therefrom through line 26 and valve 27 to storage or to other use such as the preparation of additional alkyl fluorides by reaction of hydrogen fluoride with a mono-olefin.

The hydrocarbon layer in the upper portion of separator 19 may be passed through line 28 and valve 29 to fractionator 30 containing reboiler coil 31 and provided with vapor line 32 and valve 33 through which lower boiling hydrocarbons may be released as an overhead fraction while higher boiling alkylated products may be withdrawn from the bottom of fractionator 30 through line 34 containing valve 35 to further cooling, not shown, and to storage.

The unconverted lower boiling hydrocarbons passing through line 32 may be conducted through condenser 36 and run-down line 37 containing valve 38 to receiver 39 equipped with conventional gas release line 40 containing valve 41 and with a liquid draw-off line 42 containing valve 43 leading to pump 44 which discharges through line 45 containing valve 46 to storage if desired, but ordinarily through line 25 containing valve 47 and leading to line 4, already mentioned, to permit recycling of unconverted aromatic hydrocarbon and alkyl fluoride to further alkylation.

The exact temperature and pressure to be employed when alkylating various aromatic hydrocarbons with various alkyl fluorides will depend upon the activity and physical characteristics of the reactants involved so that best results will be obtained when conditions are first determined on small scale apparatus. As a rule excessively elevated temperatures are neither necessary nor desirable and only sufficient pressure should be used to prevent excessive evaporation of the catalyst or of the alkyl fluoride.

The following specific example is introduced as representative of results obtainable by the process described, although with no intention of unduly limiting the generally broad scope of the invention:

A mixture of 3 molecular proportions of benzene, 1 molecular proportion of ethyl fluoride, and 1 molecular proportion of hydrogen fluoride may be contacted at 25° C. under a liquefying pressure to produce a mixture of mono-, di-, and polyethyl benzenes dissolved in the excess of benzene contained in the charge.

In general, mono-ethyl benzene may be obtained as a predominant product when charging a relatively high proportion of benzene while more highly alkylated derivatives result from interaction of a smaller molecular proportion of benzene with a major molecular proportion of ethyl fluoride. Hydrogen fluoride produced in the reaction may serve as additional catalyst in subsequent portions of the alkylation run.

The character of the process of the present invention and particularly its commercial value are evident from the preceding specification and example given, although neither section is intended to be unduly limiting in its generally broad scope.

I claim as my invention:

1. A process for producing alkyl derivatives of an aromatic hydrocarbon which comprises subjecting said aromatic hydrocarbon to contact with an alkyl fluoride in the presence of hydrogen fluoride.

2. A process for producing alkyl derivatives of an aromatic hydrocarbon which comprises subjecting a molal excess of said aromatic hydrocarbon to contact with an alkyl fluoride in the presence of hydrogen fluoride.

3. A process for producing alkyl derivatives of an aromatic hydrocarbon which comprises subjecting a molal excess of said aromatic hydrocarbon to treatment with an alkyl fluoride in the presence of hydrogen fluoride at a temperature between about $-10$ and about $+75°$ C. under sufficient pressure to maintain substantially liquid phase conditions.

4. A process for alkylating an aromatic hydrocarbon which comprises intimately mixing said hydrocarbon with liquid hydrogen fluoride; introducing an alkyl fluoride to the mixture; separating products of the reaction into unconverted aromatic hydrocarbon and alkyl fluoride, alkylated products, and hydrogen fluoride; and returning unconverted aromatic hydrocarbon, alkyl fluoride, and hydrogen fluoride to further reaction.

5. A process for alkylating an aromatic hydrocarbon which comprises intimately mixing said hydrocarbon with liquid hydrogen fluoride; introducing an alkyl fluoride to the mixture; maintaining the temperature between about $-10$ and about $+75°$ C. while under a pressure sufficient to insure substantially liquid phase conditions; separating products of the reaction into unconverted aromatic hydrocarbon and alkyl fluoride, alkylated products, and hydrogen fluoride; and returning unconverted aromatic hydrocarbon, alkyl fluoride, and hydrogen fluoride to further reaction.

6. A process for alkylating benzene which comprises intimately mixing said benzene with liquid hydrogen fluoride; introducing an alkyl fluoride to the mixture; maintaining the temperature between about $-10$ and about $+75°$ C. while under a pressure sufficient to insure substantially liquid phase conditions; separating products of the reaction into alkyl benzenes and unconverted benzene, alkyl fluoride, and hydrogen fluoride; and returning unconverted benzene, alkyl fluoride, and hydrogen fluoride to further reaction.

7. A process for producing ethyl benzenes which comprises subjecting a molal excess of benzene to treatment with ethyl fluoride in the presence of hydrogen fluoride at a temperature between about $-10$ and about $+75°$ C. under sufficient pressure to maintain substantially liquid phase conditions; separating products of the reaction into ethyl benzenes and unconverted benzene, ethyl fluoride, and hydrogen fluoride; and returning unconverted benzene, ethyl fluoride, and hydrogen fluoride to further reaction.

CARL B. LINN.